(12) United States Patent
Kim et al.

(10) Patent No.: US 9,983,464 B1
(45) Date of Patent: May 29, 2018

(54) DEVICE FOR PHOTOGRAPHING TRENCH VERTICAL SECTION

(71) Applicant: Korea Institute Of Geoscience And Mineral Resources, Daejeon (KR)

(72) Inventors: Bok Chul Kim, Daejeon (KR); Kyoungtae Ko, Daejeon (KR); Sung-Ja Choi, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days. days.

(21) Appl. No.: 15/800,861

(22) Filed: Nov. 1, 2017

(51) Int. Cl.
| | | |
|---|---|---|
| *G03B 17/56* | (2006.01) | |
| *G01C 11/02* | (2006.01) | |
| *F16M 11/10* | (2006.01) | |
| *F16M 11/04* | (2006.01) | |

(52) U.S. Cl.
CPC ......... *G03B 17/561* (2013.01); *F16M 11/043* (2013.01); *F16M 11/10* (2013.01); *G01C 11/02* (2013.01)

(58) Field of Classification Search
None
See application file for complete search history.

(56) References Cited

U.S. PATENT DOCUMENTS

| | | | |
|---|---|---|---|
| 7,789,356 B1* | 9/2010 | Jones | F16M 11/16 248/178.1 |
| 2010/0079101 A1* | 4/2010 | Sidman | F16M 11/041 318/649 |
| 2015/0362122 A1* | 12/2015 | Brown | F16M 11/041 348/208.2 |
| 2016/0342073 A1* | 11/2016 | Myers | G03B 17/561 |
| 2017/0153532 A1* | 6/2017 | Le | G03B 17/561 |
| 2017/0214910 A1* | 7/2017 | Hong | H04N 5/2256 |
| 2017/0261157 A1* | 9/2017 | Guo | F16M 13/022 |

FOREIGN PATENT DOCUMENTS

KR 10-1439423 B1 9/2014

* cited by examiner

*Primary Examiner* — W B Perkey
(74) *Attorney, Agent, or Firm* — Harness, Dickey & Pierce, P.L.C.

(57) ABSTRACT

The present invention relates to an apparatus for photographing a bedding plane, the apparatus including: a pair of vertical supports; a horizontal support having both ends coupled to the pair of vertical supports, respectively; a main body mounted on the horizontal support so as to be movable in a horizontal direction; a length adjustment unit mounted on the main body so as to be rotatable about the horizontal support, and having a length variable structure for adjusting a length thereof in a direction perpendicular to a longitudinal direction of the horizontal support; a camera mounting jig coupled to the length adjustment unit; a camera mounted on the camera mounting jig; and a level detector mounted on the horizontal support to detect a horizontal state by measuring a degree of inclination of the horizontal support.

8 Claims, 5 Drawing Sheets

DEVICE FOR PHOTOGRAPHING TRENCH VERTICAL SECTION

CROSS-REFERENCE TO RELATED APPLICATIONS

This application claims priority under 35 U.S.C. § 119 to Korean Patent Application No. 10-2017-0085105, filed on Jul. 4, 2017, in the Korean Intellectual Property Office, the disclosure of which is incorporated herein in its entirety by reference.

BACKGROUND OF THE INVENTION

1. Field of the Invention

The present invention relates to a device for photographing a section of a trench formed in the surface of earth, and more particularly, to a device for photographing a trench section from a direction perpendicular to the trench section, in which a photographing range of the trench section is at least several meters (m) to dozens of meters (m), so that a user can obtain a photograph of a desired magnification, and a camera can be prevented from being moved or from being unbalanced horizontally.

2. Description of the Related Art

In general, fault surveys are conducted upon exposed outcrops. The outcrop refers to a part of a vein of ore, a rock, a stratum, or a coal seam exposed on the surface of earth.

However, since outcrops of a fault tracked by geological surveyors are often covered by a quaternary strata, the surface of earth is excavated (hereafter referred to as "trench") to inspect the existence of faults. In detail, in the case of a quaternary fault related to the occurrence of earthquake, the trench survey on the surface of earth is an essential process of the research because the fault development, in most cases, is analogically analyzed based on the topography displacement.

Precise photographic data on geological outcrops is essential in geological studies. However, it is very difficult to obtain the precise photographic data for faults discovered during the trench survey. During the trench surface on the surface of earth, the scale of the trench varies depending on the fault. However, in general, the minimum width/length/depth of the trench is at least 3 m/10 m/3 m.

For a trench section of several meters (m) or more, the survey on the fault is performed by taking dozens to hundreds of photographs and editing the photographs to form a single photograph.

At this time, since it is difficult to maintain a constant magnification/distance/horizontal distance of photographing focus within a space having a width of 3 m for several dozens to hundreds of photographs, it is very difficult to form a single photograph of a fault outcrop by editing the hundreds of photographs.

Accordingly, even if a fault is found, it is very difficult to obtain a perfect high-quality photograph of the fault for the entire trench section from a trench.

Until now, photographs taken at different distances have been artificially adjusted by using a computer program to obtain only a distorted photograph of a fault, or simple photographs of a fault taken at a short distance or a long distance.

Due to these problems, the discussion is not smoothly performed when having a discussion with experts who have not observed a fault outcrop of an exposed fault by a trench. In addition, when writing a paper or report, since the photograph of the outcrop is unclear or is in low quality, it is difficult to insert the photograph in the paper or report, and it is difficult to comprehend whether the description on the fault is subjective or objective when the photograph is substituted with a sketch of the outcrop.

DOCUMENT OF RELATED ART

Patent Document (Patent document 1) Korean Patent Registration No. 10-1439423 (registered on Sep. 2, 2014)

SUMMARY OF THE INVENTION

An object of the present invention is to solve the problems of image shaking of photographs resulted due to a horizontally unbalanced camera resulting from manual photographing, and the low precision of the photograph due to the adjustment performed on the taken photographs in view of size and magnification. Accordingly, a camera for photographing the trench section is moved in a horizontal/vertical direction, and an angle of the camera is adjusted according to the inclination of the trench section such that the section can be photographed from the direction perpendicular to the section, so that the user may obtain a photograph of the trench section in a desired magnification.

To achieve the objects described above, according to the present invention, there is provided an apparatus for photographing a bedding plane, the apparatus including: a pair of vertical supports; a horizontal support having both ends coupled to the pair of vertical supports, respectively; a main body mounted on the horizontal support so as to be movable in a horizontal direction; a length adjustment unit mounted on the main body so as to be rotatable about the horizontal support, and having a length variable structure for adjusting a length thereof in a direction perpendicular to a longitudinal direction of the horizontal support; a camera mounting jig coupled to the length adjustment unit; a camera mounted on the camera mounting jig; and a level detector mounted on the horizontal support to detect a horizontal state by measuring a degree of inclination of the horizontal support.

Further, an apparatus for photographing a bedding plane according to another embodiment of the present invention may have a device for rotating a camera different from the device that rotates the camera in the above embodiment. The apparatus for photographing a bedding plane according to another embodiment includes: a pair of vertical supports; a horizontal support having both ends coupled to the pair of vertical supports, respectively; a main body mounted on the horizontal support so as to be movable in a horizontal direction and rotatable about the horizontal support; a length adjustment unit coupled to the main body, and having a length variable structure for adjusting a length thereof in a direction perpendicular to a longitudinal direction of the horizontal support; a camera mounting jig coupled to the length adjustment unit; a camera mounted on the camera mounting jig; and a level detector mounted on the horizontal support to detect a horizontal state by measuring a degree of inclination of the horizontal support.

In other words, the first apparatus for photographing the bedding plane of the above-described apparatuses has the length adjustment unit mounted on the horizontal support so as to be rotatable about the horizontal support, so that the camera may be rotated. However, the second apparatus for photographing the bedding plane has the main body mounted on the horizontal support so as to be rotatable about the horizontal support, so that the camera may be rotated. In other words, there is a difference in the configuration of rotating the camera.

Meanwhile, the above apparatuses for photographing the bedding plane according to the present invention rotates or tilts the camera according to the inclination of the bedding plane, so that the bedding plane may be photographed from a direction perpendicular to the bedding plane.

In one detailed embodiment, the vertical support has one end coupled to the horizontal support and an opposite end provided with a fixing device for fixing the apparatus for photographing the bedding plane onto a ground to prevent the apparatus from being moved, wherein the fixing device is formed integrally with the vertical support, or has a structure assembled to or disassembled from the vertical support.

Under such a structure, the apparatus for photographing the bedding plane may be stably installed on the ground. In detail, it is preferred that the fixing device includes a fixing support having a rake-shaped claw, or a tripod-type fixing support, but not limited thereto. Any device that may stably install or fix the photographing apparatus on the ground may be suitable as the fixing device.

Meanwhile, the horizontal support may be formed with a scale to move the camera by a predetermined interval in the horizontal direction so as to photograph the bedding plane.

In one detailed embodiment, the camera mounting jig may be additionally provided at one side thereof with a rotation unit which is rotatable in 360 degrees, and the camera may be coupled to the rotation unit.

The apparatus for photographing the bedding plane may further include a control unit for controlling an operation of the main body or the length adjustment unit, wherein the control unit may control horizontal movement, rotational movement, or a vertical length of the main body or the length adjustment unit, such that the bedding plane is photographed from a direction perpendicular to the bedding plane.

Accordingly, in order to control the apparatus by a user, the apparatus for photographing the bedding plane may further include a transceiving device connected to the apparatus for photographing the bedding plane in a wired/wireless manner to transmit or receive a control signal to or from the apparatus. An image of the bedding plane photographed by the photographing apparatus may be included in information received from the transceiving device.

In the photographing apparatus according to the present invention, the camera for photographing the section of the trench can be moved in the horizontal/vertical direction, and an angle of the camera can be adjusted according to the inclination of the trench section such that the section can be photographed from the direction perpendicular to the section, so that the user can obtain a photograph of the trench section in the desired magnification.

DETAILED DESCRIPTION OF THE INVENTION

Figure 1:
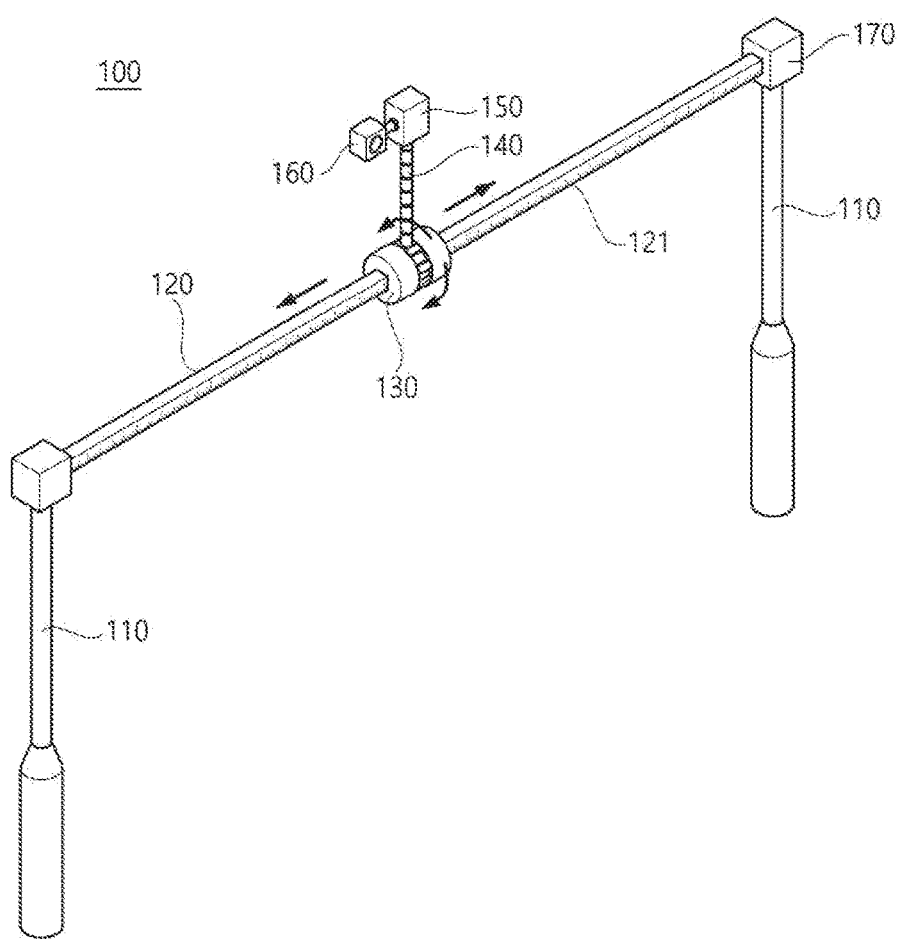
FIG. 1 is a perspective view showing an apparatus for photographing a bedding plane according to one embodiment of the present invention.

The following detailed description of the invention refers to the accompanying drawings, which illustrate specific embodiments in which the invention may be implemented. These embodiments are described in sufficient detail to enable those skilled in the art to implement the present invention. It should be understood that the various embodiments of the present invention are different, but need not be mutually exclusive. For example, certain forms, structures, and features described herein may be implemented in other embodiments without departing from the spirit and scope of the invention with regard to one embodiment. It is also to be understood that the position or arrangement of the individual elements in each disclosed embodiment may be varied without departing from the spirit and scope of the present invention. Therefore, the following detailed description is not to be taken in a limiting sense, and the scope of the present invention is to be defined only by the appended claims and includes the scope of equivalents of the claimed invention. In the drawings, like reference numerals refer to the same or similar functions throughout various aspects.

Hereinafter, preferred embodiments of the present invention will be described in detail with reference to the accompanying drawings, so that those skilled in the art may easily implement the present invention.

FIG. 1 is a perspective view showing an apparatus for photographing a bedding plane according to one embodiment of the present invention.

Referring to FIG. 1, an apparatus 100 for photographing a bedding plane includes a pair of vertical supports 110, a horizontal support 120, a main body 130, a length adjustment unit 140, a camera mounting jig 150, a camera 160, and a level detector 170.

The vertical support 110 is installed upright while having the bottom surface making contact with the ground, and functions as a support. The pair of vertical support 110 has the same length and structure, and is spaced apart from each other by a predetermined distance on left/right sides. It is preferred to form the vertical support 110 in multi-stages of at least two stages so as to be adjustable in height.

The horizontal support 120 has both ends coupled to the pair of vertical supports 110, respectively, and is installed in the horizontal direction. Since the horizontal support 120 may be formed on one surface or both surfaces of the side surfaces thereof with a scale 121, it is possible to precisely move the main body 130 that moves in the horizontal direction on the horizontal support 120.

The main body 130 is installed to be movable in the horizontal direction on the horizontal support 120. The main body 130 is slidingly moved by a predetermined distance in a longitudinal or linear direction of the horizontal support 120.

The length adjustment unit 140 may have a multi-stage structure for adjusting a length thereof in a direction perpendicular to the longitudinal direction of the horizontal support 120, one end installed on the main body 130, and another end coupled to the camera mounting jig 150.

Figure 2:
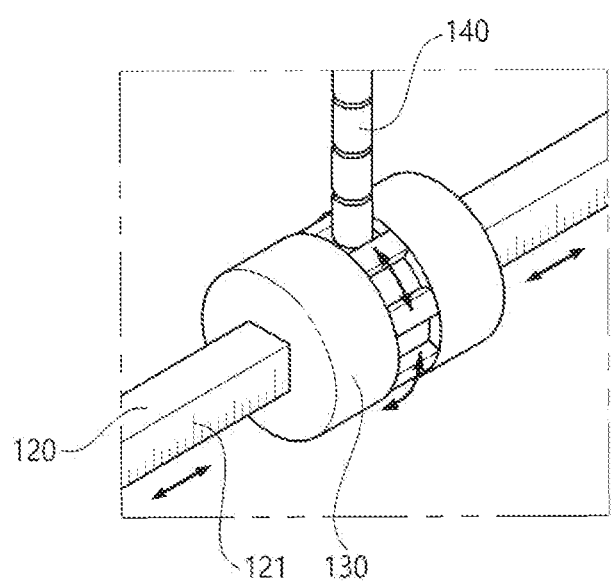
FIG. 2 is an enlarged view showing a main body shown in FIG. 1.

FIG. 2 is an enlarged view showing a main body of the apparatus for photographing the bedding plane shown in FIG. 1.

Referring to FIGS. 1 and 2, one end of the length adjustment unit 140 is installed on the main body 130 in such a structure that is rotatable within a range of 0 to 360 degrees about the horizontal support 120. Such a rotation structure serves to assist in photographing the section of the bedding plane from a direction perpendicular to the bedding plane.

The camera 160 may be mounted on the camera mounting jig 150, in which the camera 160 is a photographing device for photographing the bedding plane. The camera 160 may have a detachable structure with respect to the camera mounting jig 150, so that a user may change the type of the camera 160 mounted on the camera mounting jig 150 according to the purpose of the user.

Figure 3:
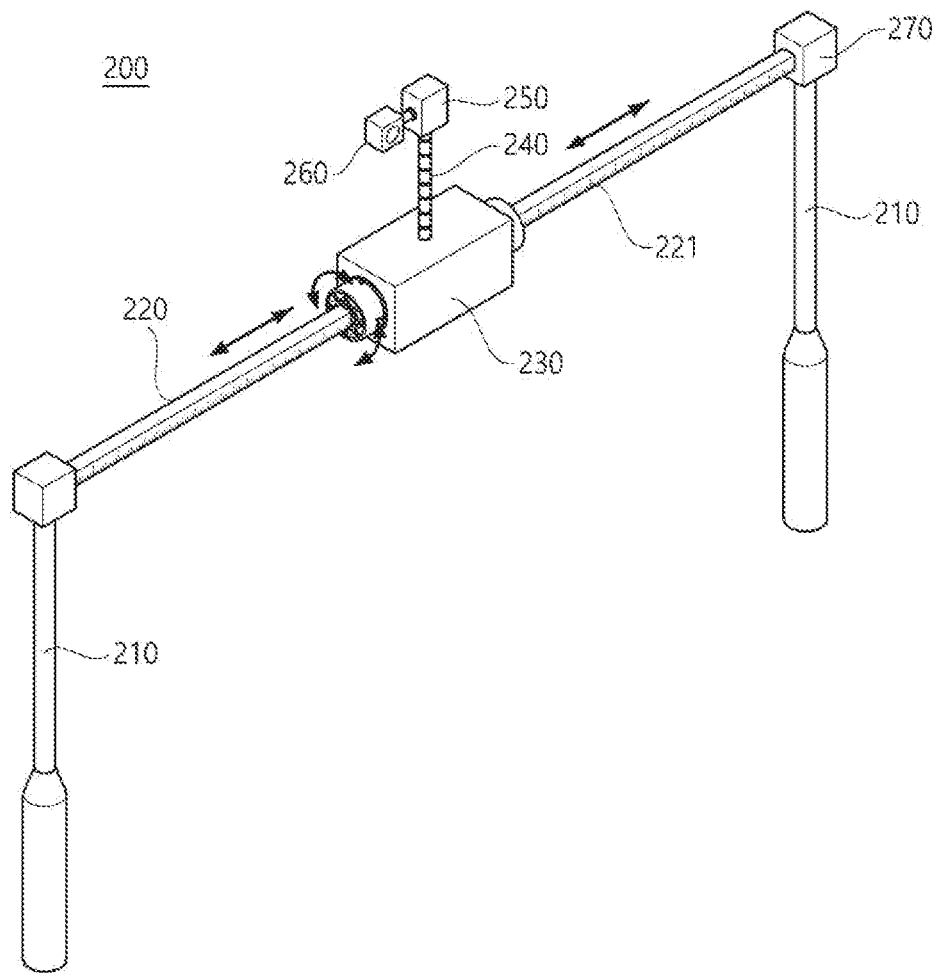
FIG. 3 is a perspective view showing an apparatus for photographing a bedding plane according to another embodiment of the present invention.
Figure 4:
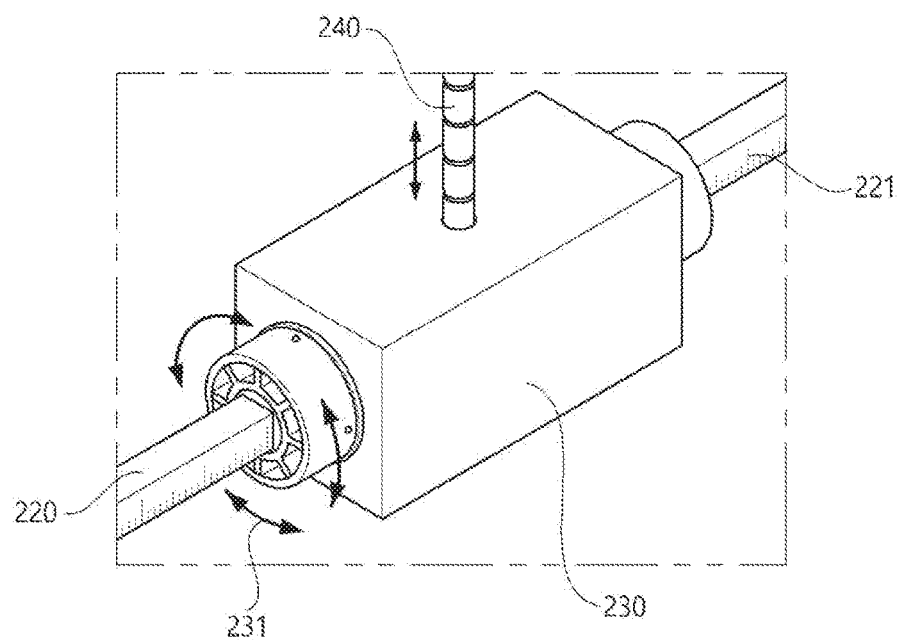
FIG. 4 is an enlarged view showing a main body shown in FIG. 3.

FIG. 3 is a perspective view showing an apparatus for photographing a bedding plane according to another embodiment of the present invention.

An apparatus 200 for photographing a bedding plane includes a pair of vertical supports 210, a horizontal support 220, a main body 230, a length adjustment unit 240, a camera mounting jig 250, a camera 260, and a level detector 270.

The apparatus 200 for photographing the bedding plane shown in FIG. 3 is different from the apparatus 100 for photographing the bedding plane shown in FIG. 1 in view of the structure for rotating the camera 220, that is, a structure in which the body 230 itself is installed on the horizontal support 220 so as to be rotatable about the horizontal support 220 in the case of the apparatus 200.

Accordingly, referring to the apparatus 200 for photographing the bedding plane, the main body 230 and the length adjustment unit 240 coupled to the main body 230 will be mainly described. Since the vertical support 210, the horizontal support 220, the camera mounting jig 250, the camera 260, and the level detector 270 are the same as those described above, the description of the corresponding configurations will be omitted.

The main body 230 is mounted on the horizontal support so as to be movable in the horizontal direction and rotatable about the horizontal support. The main body 230 is moved by a predetermined distance in the longitudinal direction of the horizontal support 220, and is rotatable within a range of 0 to 360 degrees about the horizontal support 220. Such a rotation structure serves to assist in photographing the section of the bedding plane from a direction perpendicular to the bedding plane.

Figure 5:
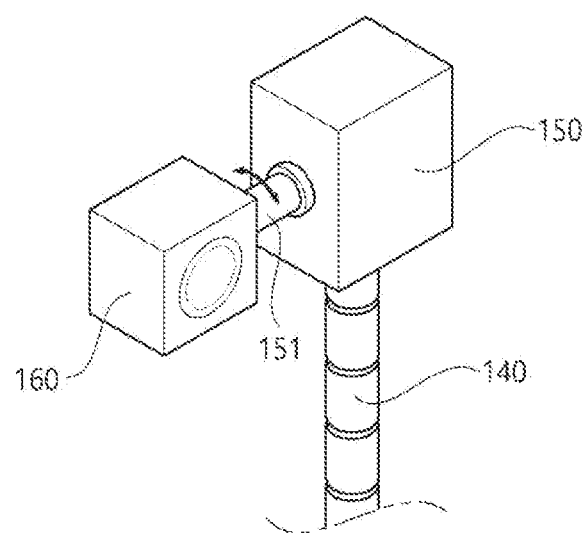
FIG. 5 is an enlarged view showing a mounting structure of a camera mounting jig and a camera in the apparatus for photographing the bedding plane shown in FIG. 1.

FIG. 5 is an enlarged view showing a mounting structure of a camera mounting jig and a camera in the apparatus for photographing the bedding plane shown in FIG. 1.

The camera mounting jig 150 is provided at one side thereof with a rotation unit 151 which is rotatable within a range of 0 to 360 degrees, and the camera 160 is coupled to the rotation unit 151.

Although not shown in the drawings, the photographing apparatus may be further provided with a control unit for controlling the operation of the body unit or the length adjustment unit. In detail, the control unit may be connected to the photographing apparatus in a wired/wireless connection manner, so that the user may manipulate the apparatus by using the control unit.

Accordingly, the user may use the control unit to adjust horizontal movement, rotational movement, or a vertical length of the main body 130 and 230 or the length adjustment unit 140 and 240, such that the bedding plane is photographed from a direction perpendicular to the bedding plane.

Referring to the photographing apparatus 100 shown in FIG. 1, the user may control the operation of the main body 130 and the length adjustment unit 140 through the control unit, and may adjust a rotation angle of the length adjustment unit 140 according to the inclination of the bedding plane, so that the camera 160 may photograph the bedding plane from a direction perpendicular to the bedding plane. In addition, in order to photograph the bedding plane more precisely from the direction perpendicular to the bedding plane, it is also possible to connect the control unit to the camera mounting jig 150 to adjust the rotation angle of the rotation unit 151 in conjunction with the rotation of the length adjustment unit 140.

In order to continuously photograph the bedding plane in the horizontal direction, the main body 130 may be adjusted to move in the horizontal direction.

In order to photograph a bedding plane located higher than a position where the photographing apparatus 100 is installed, the length of the length adjustment unit 140 may be adjusted to be long.

Meanwhile, referring to the photographing apparatus shown in FIG. 3, the user may adjust the rotation angle of the main body 230 according to the inclination of the bedding plane, so that the camera 260 may photograph the bedding plane from a direction perpendicular to the bedding plane.

What is claimed is:

1. An apparatus for photographing a bedding plane, the apparatus comprising:
a pair of vertical supports;
a horizontal support having both ends coupled to the pair of vertical supports, respectively;
a main body mounted on the horizontal support so as to be movable in a horizontal direction;
a length adjustment unit mounted on the main body so as to be rotatable about the horizontal support, and having a length variable structure for adjusting a length thereof in a direction perpendicular to a longitudinal direction of the horizontal support;
a camera mounting jig coupled to the length adjustment unit;
a camera mounted on the camera mounting jig; and
a level detector mounted on the horizontal support to detect a horizontal state by measuring a degree of inclination of the horizontal support.

2. An apparatus for photographing a bedding plane, the apparatus comprising:
a pair of vertical supports;
a horizontal support having both ends coupled to the pair of vertical supports, respectively;
a main body mounted on the horizontal support so as to be movable in a horizontal direction and rotatable about the horizontal support;
a length adjustment unit coupled to the main body, and having a length variable structure for adjusting a length thereof in a direction perpendicular to a longitudinal direction of the horizontal support;
a camera mounting jig coupled to the length adjustment unit;
a camera mounted on the camera mounting jig; and
a level detector mounted on the horizontal support to detect a horizontal state by measuring a degree of inclination of the horizontal support.

3. The apparatus of claim 1, wherein the vertical support has one end coupled to the horizontal support and an opposite end provided with a fixing device for fixing the apparatus for photographing the bedding plane onto a ground to prevent the apparatus from being moved, and wherein the fixing device is formed integrally with the vertical support, or has a structure assembled to or disassembled from the vertical support.

4. The apparatus of claim 3, wherein the fixing device includes a fixing support having a rake-shaped claw, or a tripod-type fixing support.

5. The apparatus of claim 1, wherein the horizontal support is formed with a scale to allow movement by a predetermined interval in the horizontal direction.

6. The apparatus of claim 1, wherein the camera mounting jig is additionally provided at one side thereof with a rotation unit which is rotatable in 360 degrees, and the camera is coupled to the rotation unit.

7. The apparatus of claim 1, further comprising a control unit for controlling an operation of the main body or the length adjustment unit, wherein the control unit controls horizontal movement, rotational movement, or a vertical length of the main body or the length adjustment unit, such that the bedding plane is photographed from a direction perpendicular to the bedding plane.

8. The apparatus of claim 1, further comprising a wired-wireless transceiving device for receiving a control signal from a user or receiving collected information from the photographing apparatus.

* * * * *

UNITED STATES PATENT AND TRADEMARK OFFICE
CERTIFICATE OF CORRECTION

PATENT NO. : 9,983,464 B1  
APPLICATION NO. : 15/800861  
DATED : May 29, 2018  
INVENTOR(S) : Bok Chul Kim et al.

Page 1 of 1

It is certified that error appears in the above-identified patent and that said Letters Patent is hereby corrected as shown below:

On the Title Page

Item (30) should read:  
(30) Foreign Application Priority Data  
Jul. 4, 2017 (KR).... 10-2017-0085105

Signed and Sealed this  
Fourth Day of June, 2019

Andrei Iancu  
*Director of the United States Patent and Trademark Office*